United States Patent [19]
Noguchi et al.

[11] Patent Number: 6,159,304
[45] Date of Patent: Dec. 12, 2000

[54] SOLDER PASTE

[75] Inventors: Hiroji Noguchi; Masahiko Hirata, both of Kadoma; Toshihiko Taguchi; Kunihito Takaura, both of Tokyo, all of Japan

[73] Assignees: Matsushita Electric Industrial Co., Ltd., Osaka; Senju Metal Industry Co., Ltd., Tokyo, both of Japan

[21] Appl. No.: 09/260,604

[22] Filed: Mar. 2, 1999

Related U.S. Application Data

[63] Continuation of application No. PCT/JP98/02929, Jun. 30, 1998.

[30] Foreign Application Priority Data

Jul. 3, 1997 [JP] Japan ................................... 9-192022

[51] Int. Cl.[7] .............................................. B23K 35/34
[52] U.S. Cl. ................................................. 148/23; 148/24
[58] Field of Search ......................................... 148/23, 24

[56] References Cited

U.S. PATENT DOCUMENTS

| | | | |
|---|---|---|---|
| 4,077,815 | 3/1978 | Schuessler | 148/23 |
| 4,460,414 | 7/1984 | Hwang | 148/23 |
| 5,296,046 | 3/1994 | Juskey et al. | 148/23 |

FOREIGN PATENT DOCUMENTS

| | | | |
|---|---|---|---|
| 53-76942 | 7/1978 | Japan | B23K 35/362 |
| 4-313487 | 11/1992 | Japan | B23K 35/22 |

OTHER PUBLICATIONS

Asano, Shozo. "Water Soluble Cream Solder" Japanese Patent Abstract JP 4–4313487 A, Nov. 1992.

The American Heritage Dictionary of the English Language, Third Edition 1992.

Derwent Abstract #419088 "Water–Soluble Solder Cream for PCB(s)" for JP 04313487 Nov. 5, 1992.

Lewis, Richard J., "Condensed Chemical Dictionary," 12th edition. 1993. P. 1012.

*Primary Examiner*—Roy V. King
*Assistant Examiner*—Tima McGuthry-Banks
*Attorney, Agent, or Firm*—Sughrue, Mion, Zinn, Macpeak & Seas, PLLC

[57] ABSTRACT

In order to prevent aging of an Sn—Zn system alloy solder paste, 0.5–5% by weight of a compound obtained by adding an ethylene oxide to cyclohexylamine, preferably together with 0.5–5% by weight of a polyoxyethylene alkylamine is added to a flux of said solder paste.

2 Claims, 1 Drawing Sheet

SOLDER PASTE

CROSS REFERENCE TO RELATED APPLICATION

This is a continuation application of earlier filed application PCT/JP98/02929, filed Jun. 30, 1998, the disclosure of which is incorporated herein by reference.

TECHNICAL FIELD

The present invention relates to a lead-free solder paste, and in particular, to a solder paste which contains a lead-free, Sn—Zn alloy solder.

BACKGROUND ART

An Sn—Pb alloy has been widely used for many years as a soldering alloy for use in carrying out soldering on electronic equipment. An Sn—Pb alloy has a melting point of 183° C. at its eutectic composition (63%Sn-bal.Pb), and it has a soldering temperature of 220–230° C. which is low enough not to thermally damage heat-sensitive electronic devices. In addition, an Sn—Pb alloy exhibits an extremely high level of soldering performance, and it also has the feature that since there is no substantial difference in temperature between the liquidus line and the solidus line, solidification will take place immediately after soldering without resulting in cracking or separation in a soldered area even if vibration or impact is applied to this area during soldering.

Electronic equipment, such as televisions, video machines, radios, tape recorders, computers, and copy machines are discarded when they malfunction, or become old-fashioned. Since each of these apparatuses includes an outer cover and printed circuit boards of a synthetic resin, and electrically-conducting members and an inner frame each made of a metallic material, they cannot be disposed of by burning, and they are mostly disposed of underground in landfills.

Recently, fossil fuels such as gasoline and heavy oil have been consumed in great amounts, and a large amount of sulfur oxides have been released to the atmosphere, resulting in the occurrence of acid rain. Such acid rain water penetrates into the ground and can dissolve the lead which is contained in the soldered portions of electronic equipment which has been disposed of by underground burial, so that the ground water is contaminated by lead. If the contaminated water enters the water supply and is ingested for long periods, a person drinking the water may have a buildup of lead within his body, leading to the possibility of lead poisoning.

Under these circumstances, in the electronic device industry, development of an alloy solder which does not contain lead, i.e., a lead-free alloy solder, is highly desired.

Conventionally, as a lead-free soldering alloy, an Sn—Ag alloy, an Sn—Sb alloy, an Sn—Bi alloy, and an Sn—Zn alloy, all of which contain predominantly Sn, have been proposed.

An Sn—Ag alloy has a melting temperature of 221° C. at its eutectic composition of Sn-3.5%Ag, which exhibits the lowest melting point. The soldering temperature for this alloy composition is 260–270° C. which is relatively high, and when soldering is carried out on some heat sensitive electronic devices, they suffer from thermal damage, resulting in a deterioration in performance and the destruction of the device.

An Sn—Sb alloy has its lowest melting temperature at a composition of Sn-5%Sb. At this composition, the solidus temperature is 235° C. and the liquidus temperature is 240° C., which are rather high. Thus, the soldering temperature for this alloy is 280–300° C., which is higher than that for an Sn-3.5%Ag alloy. In this range, thermal damage to heat sensitive electronic devices is inevitable.

On the other hand, in the case of an Sn—Bi alloy, its eutectic composition is Sn-42%Bi and its eutectic point is 139° C., which is relatively low compared with that of the eutectic Sn—Pb alloy. From this viewpoint an Sn—Bi alloy is applicable as a soldering alloy unless a soldered area is exposed to a high temperature atmosphere over the eutectic point after soldering. However, an Sn—Bi alloy is brittle and hard, and its mechanical properties such as tensile strength and elongation are not satisfactory.

In contrast, an Sn—Zn alloy has a eutectic point of 199° C. at a eutectic composition of Sn-9%zn. Thus, an Sn—Zn alloy is superior to the other alloys with respect to its melting point, i.e., its eutectic point, which is close to the eutectic point, 183° C. for the conventional 63%Sn—Pb soldering alloy. An Sn—Zn alloy is also superior to an Sn—Pb alloy with respect to mechanical strength.

However, the soldering performance of an Sn—Zn alloy is not satisfactory. In order to improve its solderability as well as its mechanical strength, a variety of Sn—Zn system alloys have been proposed, in which optional elements such as Ag, Cu, Bi, In, Ni, and P are added to the base Sn—Zn alloy.

Soldering performance can be achieved using a soldering iron for these Sn—Zn system alloys in the form of wire so long as a suitable composition of a flux is employed.

However, when these Sn—Zn system alloys are used as a solder paste in which the Sn—Zn alloy is pulverized and mixed with a pasty flux to form a solder paste, the soldering performance is not satisfactory. Thus, when soldering is carried out using a solder paste containing Sn—Zn alloys, soldering defects are unavoidable such that an area to be soldered is not completely wetted (dewetting) and voids remain as dotted unsoldered areas under the soldered portion, which appears to the eye to be well soldered.

DISCLOSURE OF INVENTION

In order to improve solderability of a solder paste containing an Sn—Zn system solder alloy (hereunder referred to merely as a Zn-system solder paste), a strong active agent which is effective to improve wettability of solder can be added to a flux. However, the Zn of an Sn—Zn alloy is easily oxidized or corroded to loose its metallic properties completely when it contacts a strong activator, resulting in aging of the Zn-system solder paste.

If such aging occurs, the viscosity of the paste will change. Normally, solder paste is viscous but can be stirred with a spoon or rod with ease just after formulation of the paste since aging has not occurred at all. However, once aging occurs, the viscosity of the paste increases so that it is rather difficult to carry out stirring.

Conventional Zn-system solder pastes are easily degraded by aging. When they are applied to a printed circuit board by screen printing or dispensing and are heated in a reflow furnace, it sometimes happens that they are not melted at all or a large amount of oxides is formed. Furthermore, even if the conventional Zn-system solder paste does not suffer from aging, it exhibits poor solderability. Namely, when it is heated in a reflow furnace in the presence of air, the solder is melted but it is hard to spread the melted solder.

Thus, the object of the present invention is to provide a Zn-system solder paste which is highly resistant to aging and which exhibits a satisfactory level of solderability even if it is heated in a reflow furnace in air.

The inventors of the present invention reached the subject invention on the basis of the findings that certain types of amine compounds are effective to form coatings on Sn—Zn system solder alloy particles so as to prevent Zn ions from dissolving in a flux and that not only the resistance to aging but also the solderability of such a solder paste are improved to a satisfactory level.

Although the improvements in resistance to aging and in solderability, which are caused by the provision of coatings of solder alloy particles, are particularly notable for the Zn-system solder paste, improvements over the prior art in respect to the resistance to aging as well as solderability can be obtained even when other solder particles are used.

Thus, in its broad aspect, the present invention is a solder paste, characterized in that solder particles and a flux are commingled, the flux being mixed with 0.5–5% by weight of a compound which is formed by adding an ethylene oxide to cyclohexylamine.

In another aspect, the present invention is a solder paste, characterized in that solder particles and a flux are commingled, the flux being mixed with 0.5–5% by weight of a compound which is formed by adding an ethylene oxide to cyclohexylamine, and 0.5–5% by weight of a polyoxyethylene alkylamine.

More specifically, the present invention is a solder paste, characterized in that particles of an Sn—Zn-system solder alloy and a flux are commingled, the flux being mixed with 0.5–5% by weight of a compound which is formed by adding an ethylene oxide to cyclohexylamine.

Furthermore, the present invention is a solder paste, characterized in that particles of an Sn—Zn system solder alloy and a flux are commingled, the flux being mixed with 0.5–5% by weight of a compound which is formed by adding an ethylene oxide to cyclohexylamine, and 0.5–5% by weight of a polyoxyethylene alkylamine.

BEST MODE FOR CARRYING OUT THE INVENTION

Figure 1:
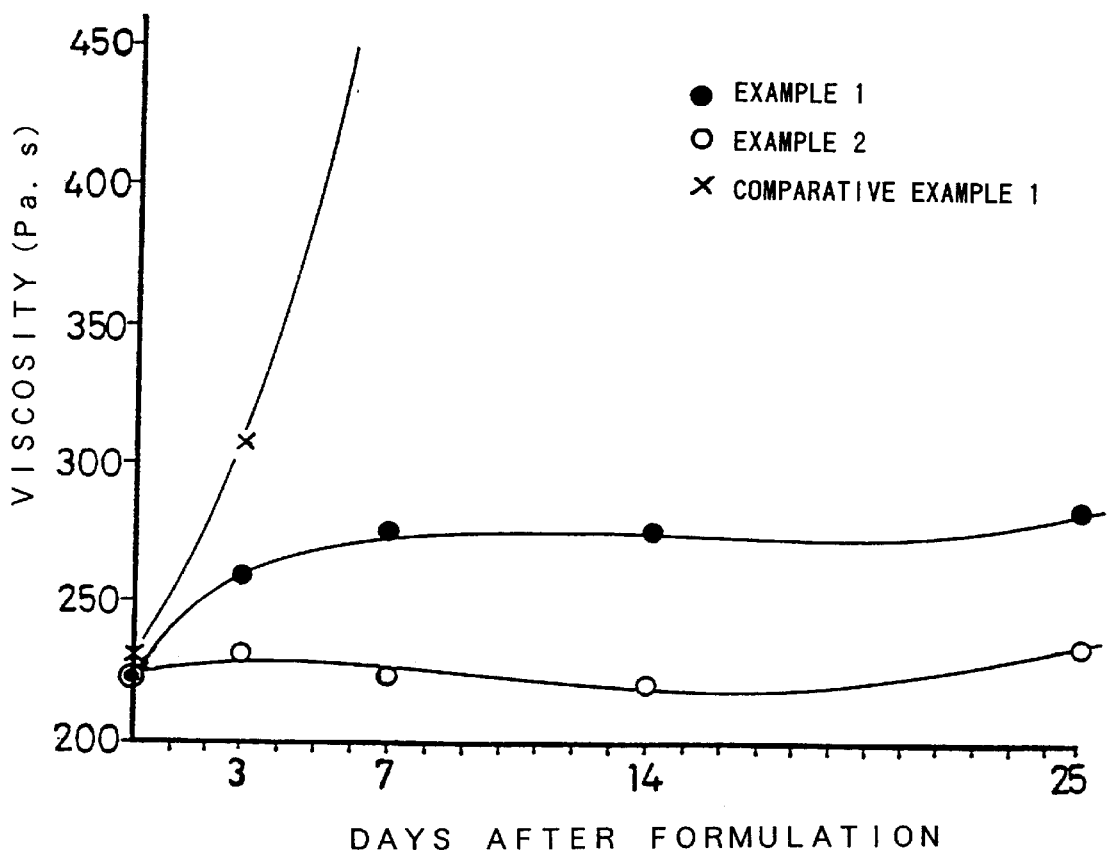
FIG. 1 is a graph showing variations of viscosity with time for an example of a Zn-system solder paste of the present invention and for a comparative example of a Zn-system solder paste.

The compound which is used in the present invention and which is formed by adding an ethylene oxide to cyclohexylamine is a compound having a chemical structure shown below by formula (1). The compound is referred to as "amine compound" for clarification hereinafter. This compound is commercially available under the tradename "CHE-20" from Nihon Nyukazai K.K. (Japan Emulsion Co. Ltd.) and the tradename "CHE-20P" from Shin Nihon Rika K.K.

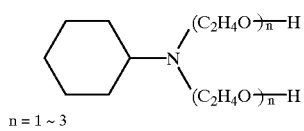

n = 1 ~ 3

(1)

According to the present invention, 0.5–5% by weight of the amine compound is added to a flux of solder paste. When the amount of the amine compound is less than 0.5% by weight, an intended effect with respect to improvement in solderability and prevention of aging cannot be obtained. On the other hand, when the amount thereof is larger than 5% by weight, the solderability is degraded. Preferably, the lower limit thereof is 1.0% by weight, further preferably 1.5% by weight and the upper limit thereof is 3.0% by weight.

According to another embodiment of the present invention, the addition of a polyoxyethylene alkylamine to the amine compound-containing flux may further improve the resistance of the flux to aging.

The polyoxyethylene alkylamine which is used in the present invention is a nonionic surface active agent having a chemical structure shown below by formula (2) or (3). This compound is effective to strengthen the coatings of solder particles. The compound is referred to as an "amine surfactant" for clarity hereinafter. The amine surfactant is commercially available under the tradename "NEWCOL 405", "NEWCOL 410", or "NEWCOL LA-407" from Nihon Nyukazai K.K. (Japan Emulsion Co. Ltd.) and under the tradename "AMIET 105" or "AMIET 320" from Kao Corporation.

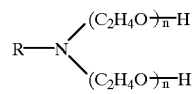

(2)

or

(3)

wherein R: $C_mH_{2m+1}$, m=8~18 in formulas (2) and (3)

A suitable amount of the amine surfactant to be added to a flux to which the amine compound has been added is 0.5–5% by weight. When the amount of the amine surfactant is less than 0.5% by weight, the resistance to aging of a Zn-system solder paste is not improved thoroughly. On the other hand, when the amount of the amine surfactant is larger than 5% by weight, the solderability is degraded. A preferable content of the amine surfactant is 1.5–3.0% by weight.

Conventional Zn-system solder pastes easily suffer from aging because Zn is a metal which is very reactive with an acid or alkali, and Zn is selectively corroded within an active flux. In particular, since the Sn—Zn system alloy is in the form of particles in a solder paste, a surface area of Zn is increased markedly and is attacked vigorously by the flux. However, if the amine compound is incorporated in the flux, the coatings of an amine cover the solder particles to prevent corrosion by the flux. Furthermore, if the amine surfactant is added to the flux together with the amine compound, the coating of the amine compound is further strengthened to improve the resistance to aging.

The term "aging" in general means a change in the properties of the solder paste with time. In the present specification, however, the term "aging" means a change in viscosity with time.

The term "solderability" means properties evaluated by an area of spreading of melted solder when heated in a reflow furnace in an air-containing atmosphere. According to the present invention, such properties can be improved by employment of the amine compound and optionally the amine surfactant. In this respect, such properties of conventional Sn—Zn alloys can be improved to some extent even by addition of Ag, Cu, Bi, In, Ni, and P as alloying elements, but they can not be used in solder paste. Thus, in a further preferred embodiment of the present invention, Sn—Zn system alloys additionally containing such an alloying element may be used in solder paste.

The flux to which the amine compound or the amine compound together with the amine surfactant can be added in accordance with the present invention may be, for example, the same as that used in solder paste containing an Sn—Pb system solder alloy. An example of the flux is a rosin flux which comprises rosin as main component, and the other component may be a thixotropic agent, activator, etc. These components are in solid form and are dissolved in a solvent when they are used.

A preferred flux of the present invention predominantly comprises rosin or modified rosin, and optionally comprises a thixotropic agent (e.g. hardened castor oil, fatty amide), an activator (e.g. diphenylguanidine HBr, cyclohexylamine HBr) in a solvent (ex. α-terpineol oil, diethylene glycol monohexyl ether).

EXAMPLES

Example 1

10% by weight of a flux and 90% by weight of a solder alloy powder were mixed to prepare a solder paste. The resulting solder paste was evaluated with respect to its resistance to aging and solderability.

Flux: 10% by weight

| | |
|---|---|
| Polymerized rosin (rosin) | 47% by weight |
| Hardened castor oil (thixotropic agent) | 5% by weight |
| Diphenylguanidine HBr (activator) | 2% by weight |
| CHE-20 (Amine compound) | 3% by weight |
| α-terpineol oil (solvent) | 43% by weight |

Sn-8%Zn-3%Bi alloy powder: 90% by weight

Example 2

10% by weight of a flux and 90% by weight of a solder alloy powder were mixed to prepare a solder paste. The resulting solder paste was evaluated with respect to its resistance to aging.

Flux: 10% by weight

| | |
|---|---|
| Polymerized rosin (rosin) | 47% by weight |
| Hardened castor oil (thixotropic agent) | 5% by weight |
| Diphenylguanidine HBr (activator) | 2% by weight |
| CHE-20 (Amine compound) | 3% by weight |
| NEWCOL 405 (Amine surfactant) | 2% by weight |
| α-terpineol oil (solvent) | 41% by weight |

Sn-8%Zn-3%Bi alloy powder: 90% by weight

Comparative Example 1

Flux: 10% by weight

| | |
|---|---|
| Polymerized rosin (rosin) | 50% by weight |
| Hardened castor oil (thixotropic agent) | 5% by weight |
| Diphenylguanidine HBr (activator) | 2% by weight |
| α-terpineol oil (solvent) | 43% by weight |

Sn-8%Zn-3%Bi alloy powder: 90% by weight

The resistance to aging for the Zn-containing solder paste of Examples 1 and 2 and Comparative Example 1 was determined and shown by a graph in FIG. 1.

The resistance to aging was determined by placing the Zn-containing solder paste in a container kept at 25° C., and the change in viscosity was measured.

As is apparent from FIG. 1, the viscosity gradually increased within 7 days after formulation, but after that period, there was no substantial change in viscosity for the Zn-containing solder paste of Example 1. For the Zn-containing solder paste of Example 2, there was no substantial change in viscosity since its formulation.

In contrast, for the Zn-containing solder paste of Comparative Example 1, the viscosity started to sharply increase immediately after formulation. After 3 days from formulation, the viscosity was so high that it was impossible to carry out printing nor dispensing.

When solder paste suffers from aging, the viscosity of the paste increases, making it difficult to carry out printing and dispensing. Furthermore, solderability is degraded, and it is inevitable that small balls of solder or oxides of solder adhere to the surface of an area surrounding a soldered spot.

Table 1 shows data of solderability which were determined for the Zn-containing solder pastes of Examples 1 and 2 and Comparative Example 1. As is apparent from these data shown in Table 1, solderability is also improved in accordance with the present invention.

TABLE 1

| | Solderability after formulation | | | | |
|---|---|---|---|---|---|
| | 0 day | 3 days | 7 days | 14 days | 25 days |
| Compara. Example 1 | ○ | Δ | X | X | X |
| Example 1 | ○ | ○ | ○ | ○ | ○ |
| Example 2 | ○ | ○ | ○ | ○ | ○ |

Note: Solderability
○: No formation of solder balls, and good reflowing
Δ: A small number of solder balls are formed
X: Substantially no melting

Industrial Applicability

The Zn-containing solder paste of the present invention is substantially free from aging for an extended period of time, and there is no difficulty in applying the solder paste by printing or dispensing. It is also possible to obtain a reliable soldered spot which is free from adhesion of small solder balls and oxides to the surface of the soldered spot.

What is claimed is:

1. A solder paste comprising a Zn-system solder alloy particles and a rosin flux commingled therewith, characterized in that the flux being mixed with 0.5–5% by weight of a compound which is formed by adding an ethylene oxide to cyclohexylamine, and which is shown by the following formula:

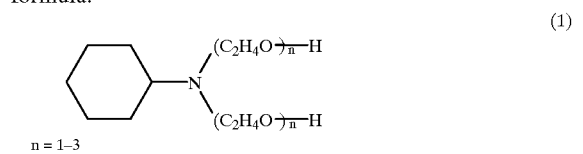

$n = 1\text{–}3$ (1)

2. A solder paste as set forth in claim 1 wherein the flux is further mixed with 0.5–5% by weight of a polyoxyethylene alkylamine shown by the following formula:

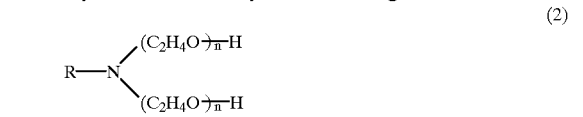
(2)

or

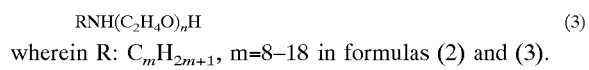
$RNH(C_2H_4O)_nH$ (3)

wherein R: $C_mH_{2m+1}$, m=8–18 in formulas (2) and (3).

* * * * *